United States Patent [19]

Terayama et al.

[11] Patent Number: 5,115,361

[45] Date of Patent: * May 19, 1992

[54] GUIDE MECHANISM FOR POSITIONING TAPE GUIDES IN A MAGNETIC TAPE LOADING APPARATUS

[75] Inventors: Takao Terayama, Ushiku; Hajime Yokota, Katsuta; Kazuo Sakai, Ibaraki; Nobuyuki Kaku, Yokohama, all of Japan

[73] Assignee: Hitachi, Ltd., Tokyo, Japan

[*] Notice: The portion of the term of this patent subsequent to Sep. 12, 2006 has been disclaimed.

[21] Appl. No.: 603,289

[22] Filed: Oct. 25, 1990

Related U.S. Application Data

[63] Continuation-in-part of Ser. No. 381,960, Jul. 19, 1989, abandoned, and a continuation-in-part of Ser. No. 697,497, May 3, 1991, which is a continuation of Ser. No. 155,886, Feb. 16, 1988, Pat. No. 4,866,549.

[30] Foreign Application Priority Data

Feb. 25, 1987 [JP] Japan ................. 62-42097
Oct. 25, 1989 [JP] Japan ................. 1-275870

[51] Int. Cl.$^5$ .................................. G11B 15/665
[52] U.S. Cl. .................................. 360/85
[58] Field of Search .......................... 360/85

[56] References Cited

U.S. PATENT DOCUMENTS

| | | | |
|---|---|---|---|
| 4,322,761 | 3/1982 | Beitler et al. | 360/85 |
| 4,796,115 | 1/1989 | Ohshima et al. | 360/85 |
| 4,866,549 | 9/1989 | Terayama et al. | 360/85 |

*Primary Examiner*—Robert S. Tupper
*Attorney, Agent, or Firm*—Antonelli, Terry Stout & Kraus

[57] ABSTRACT

A magnetic tape loading apparatus has a rotatable cylindrical drum, tape guides, tape pulling movable members and guide members. The guide members guide the tape guide and control a posture of the tape guide by changing the position and the inclination.

9 Claims, 8 Drawing Sheets

GUIDE MECHANISM FOR POSITIONING TAPE GUIDES IN A MAGNETIC TAPE LOADING APPARATUS

CROSS REFERENCE TO RELATED APPLICATIONS:

This application is a Continuation-In-Part of copending Continuation application Ser. No. 07/381,960 filed on Jul. 19, 1989, now abandoned, and U.S. application Ser. No. 697,497 filed May 3, 1991 which is a continuation of application Ser. No. 155,286, filed Feb. 26, 1988 now U.S. Pat. No. 4,866,549.

FIELD OF THE INVENTION

The present invention relates to a magnetic tape loading apparatus for an information handling apparatus, such as a video tape recorder (VTR) in which a magnetic tape is helically engaged around a cylinder for recording information on the tape or reproducing information recorded on the tape.

BACKGROUND OF THE INVENTION

In VTRs, when image information is to be recorded on a magnetic tape or when the image information recorded on the magnetic tape is to be reproduced on a TV monitor, the magnetic tape is loaded by pulling out the magnetic tape accommodated in a tape cassette to a predetermined position and then helically engaging the magnetic tape around the outer periphery of the drum, with the magnetic tape being run in that state. That is, a head for recording information on the magnetic tape and for reproducing information recorded on the magnetic tape is disposed on the outer peripheral portion of the drum. As the drum rotates, the head traces the magnetic tape helically engaged around the drum at an angle, so that information is recorded on the magnetic tape or the information recorded on the magnetic tape is reproduced.

In such information handling apparatus, in which the tape is helically engaged around the drum, the tape is pulled out by tape guides whose travelling path is determined by the tape pulling out members which support the tape guides and the guide members along which the tape pulling out members slide.

U.S. Pat. No. 4,322,761 discloses a tape guide means which is capable of bringing the magnetic tape into helical contact with the drum. This tape guide means includes guide rails disposed on opposite sides of the drum and two guide pins supported on carriages movable along the respective rails. One of the rails extends in parallel to the plane on which the cassette is placed, and the other rail extends in a downward inclination from that plane. Each carriage on which the guide pin is supported moves along a groove in a side surface of the rail. While moving, the guide pin is at first inclined in a forward direction and then inclined in a forward and rightward direction.

The object of movement of the guide pins in the guide means of U.S. Pat. No. 4,322,761 is to pull out or withdraw the tape to a predetermined position which allows the tape to helically engage the drum, and no consideration is give to damage to the tape which would occur during the loading operation.

Recently, there has been a great demand for increasing the recording time (or reproducing time) of a video tape. To meet this requirement without changing the size of the cassette case, the thickness of the tapes must be reduced so as to increase the amount (length) of tape accumulated in the cassette case. Thus, there has been a tendency to reduce the thickness of the tapes.

However, reduction in the thickness of the tapes extremely reduces the strength thereof. In FIG. 14, a graph shows a relationship between the tape strength ratio and the recording time ratio, with the tape strength ratio of 20 μm thickness being 1.

As can be seen from FIG. 14, as the thickness of the tapes reduces, the recording time thereof increases, however, the tape strength is extremely reduced. In recording a reproduction operation, such a thin tape may rise on a lead of the drum or be dislodged from the lead during loading. Alternatively, the tape edge may be pressed against the lead to buckle the tape, which leads to folding and damaging of the tape.

In accordance with the present invention, a magnetic tape loading device is provided which comprises a rotatable cylindrical drum having a lead provided on an outer periphery thereof, with a magnetic tape being engageable with the drum during operation of the device. A head is provided on the drum to record information on the tape or to reproduce information from the tape, with a pair of tape guides being provided for pulling out or withdrawing the tape from a tape cassette for engagement with the drum. A pair of tape pulling movable members respective support the tape guides, and a pair of guide members guide the tape guide and control the position of the tape guides so that an edge of the tape runs along the lead of the drum.

In accordance with further features of the present invention, a magnetic tape loading apparatus is provided which includes a rotatable drum having a lead on a periphery thereof, with a head being provided on the periphery of the drum for recording information on a tape or reproducing information recorded on the tape. A pair of tape guides pull out or withdraw the tape from a tape cassette to engage the tape with the drum. A tape guide returning means is provided so as to accommodate a return of the tape back to the tape cassette. A pair of tape pulling or withdrawing movable members respectively support the tape guides, with a pair of guide members having a sliding-surface thereon on which the pair of movable members are moved to thereby control a posture of the tape guide so as to be kept substantially accurately positioned from a start of a pulling out or withdrawing of the tape until when a part of the tape contacts the drum. Thus, the sliding surface is formed so that an edge of the tape continuously runs along the lead on the drum as a portion of the tape with which the tape contacts the drum increases.

In accordance with still further features of the present invention, a magnetic tape loading apparatus is provided which includes a rotatable cylindrical drum having a lead, with a head being provided on a periphery of the drum for recording information on a magnetic tape which is pulled out from a tape cassette and for reproducing information recorded on the tape. A pair of tape guides pull or withdraw the tape out of the tape cassette for enabling the tape to engage with the drum. A pair of tape pulling movable members respectively support the tape guides, with a pair of guide members being provided for guiding the tape guide so as to control the posture of the tape guides with a edge of the tape being kept along the lead of the drum. A pair of movable correcting guides control an angle through which the tape engages with the tape guide by moving with the correcting guide made contact with the contact in connection with the movement of the tape in a process of pulling out the tape.

In accordance with still further features of the present invention, a magnetic tape loading apparatus is provided which includes a drum, having on an outer peripheral portion thereof, a lead to restrict a position of a magnetic tape which engages around the drum in a peripheral direction of the drum. A head is rotatable around a center of the drum for recording information on the tape or for reproducing information from the tape. Tape guides are provided for pulling out the tape from a tape cassette in which the tape has been accommodated and for returning the tape into the tape cassette. Movable correcting guides correct an angle through which the tape makes contact with the tape guides, and tape pulling movable members support and move the tape guides. Guide members are provided along which the tape pulling movable members slide, with the guide members having a surface along which the tape pulling movable members slide. The surface is formed so that a posture of the tape guide remains from when the tape is pulled out until a part of the tape makes contact with the drum and so that an edge of the tape continuously runs along the lead on the drum as a contact angle through which the tape is brought into contact with the drum increases after the tape makes contact with the drum.

Preferably, in accordance with the present invention, the tape pulling movable members slide along the sliding surfaces provided on front and rear surfaces of the guide member. The slide surfaces change the positions of the tape guides relative to the drum to assure that an edge of the tape continuously runs along the lead of the drum.

In accordance with still further features of the present invention, a magnetic tape loading apparatus is provided which comprises a rotatable drum having a lead, with a pair of tape guides being provided for pulling out a magnetic tape accommodated in a tape cassette. A pair of first movable correcting guides correct an angle through which the tape enters and exits from the tape guides to substantially zero in connection with the movement of the tape guides. A pair of tape pulling movable members support and move the tape guides, with a pair of guide members being disposed on opposite sides of the drum. The guide members have a sliding surface along which the movable correcting guide slides, with the sliding surface being formed so as to control a posture of the tape guide with an edge of the tape being constantly maintained along the lead on the drum. A pair of second movable correcting guides are provided for correcting an angle through which the tape makes contact with the first movable correcting guides.

DETAILED DESCRIPTION OF THE PREFERRED EMBODIMENTS

Figure 1:
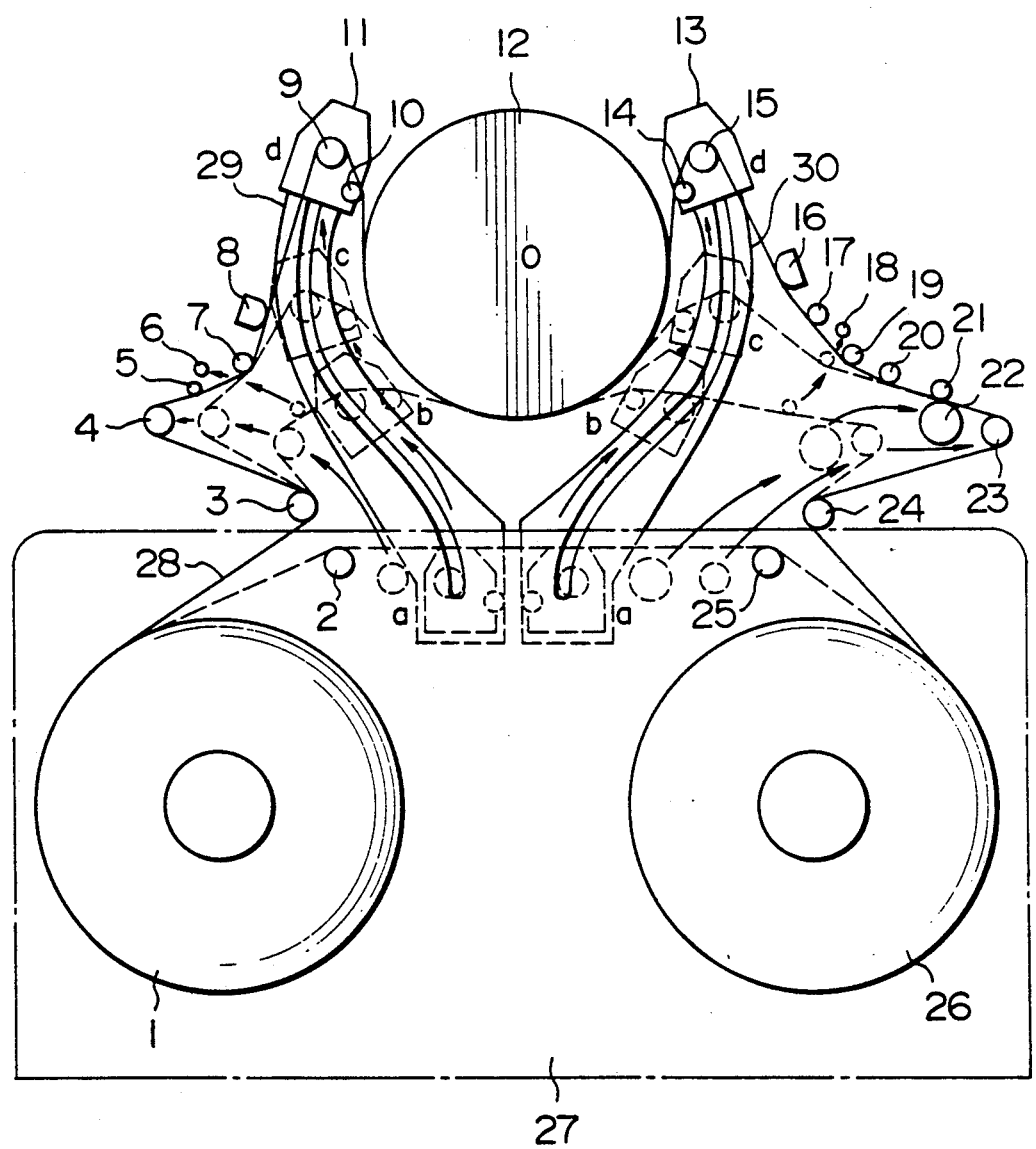
FIG. 1 is a plan view of an embodiment of a tape loading mechanism constructed in accordance with the present invention.
Figures 2, 3, 4A, 4B, 4C, 4D:
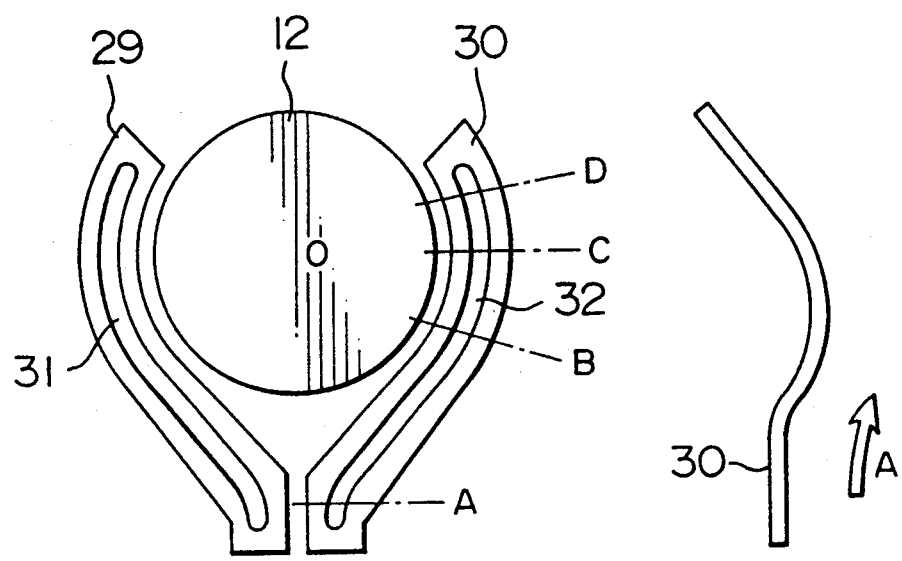
FIG. 2 is a schematic plan view of guide members of the tape loading mechanism of the present invention.
FIG. 3 is a side view of the guide member of FIG. 2.
FIGS. 4A-4D are cross-sectional views taken along the lines A, B, C, D, respectively, in FIG. 2.

Referring now to the drawings wherein like reference numerals are used throughout the various views to designate like parts and, more particularly, to FIG. 1, according to this figure, in a magnetic recording/reproduction apparatus, tape 28 is adapted to be pulled out of or withdrawn from a reel 1 in a cassette 27 and to be accumulated on a reel 26 in the tape cassette 27, with the cassette 27 having fixed pins 2 and 25 therein. The magnetic recording/reproduction apparatus includes a rotational cylindrical drum 12 on which the image recording and reproduction heads (not shown) are mounted. Tape guides 9 and 15 are respectively disposed on tape pulling movable members 11 and 13 so that the tape 28 may be engaged around the drum 12. The movable members 11 and 13 also have slanting pins 10 and 14 thereon, with the slanting pins 10, 14 being movable together with the tape guides 9 and 15. While the tape is loaded, movable correcting guides 6 and 18 are supported by motor-driven sliders so as to move in synchronism with the movement of the tape guides 9 and 15 such that the tape 28 is pressed in a withdrawing direction of the tape. Also, the tape 28 is pulled out or withdrawn sideways and is brought into contact with a capstan 21 by the movement of tape pulling posts 4 and 23. A pinch roller 22 moves together with the tape pulling post 23 and presses the tape 28 against the capstan 21 when loading of the tape has been completed. Fixed pins 7 and 17 respectively disposed in the loading apparatus bring the tape 28 into contact with an erase head 8 and a audio head 16 at a predetermined tape engaging angle. Additional fixed pins 20, 24 are also provided. Fixed slanting guides 5 and 19 are provided for correcting or compensating the inclination of the tape 28. As shown in FIG. 2, guide members 29 and 30 are disposed on opposite sides of the rotational drum 12, with the guide members 29, 30 being respectively provided with guide grooves 31 and 32. As shown in FIG. 3, the guide member 30 which is straight at the initial point (the lower point as viewed in FIG. 3), is first curved in a downward direction and then in an upward direction. As shown in FIG. 4, the guide member 30 is horizontal at point A, then inclined rightward at point B, horizontal again at point C, and finally inclined leftward at point D. The guide member 29 is also constructed such that it is curved upwardly and downwardly and inclined rightwardly and leftwardly as described below.

Figure 5:
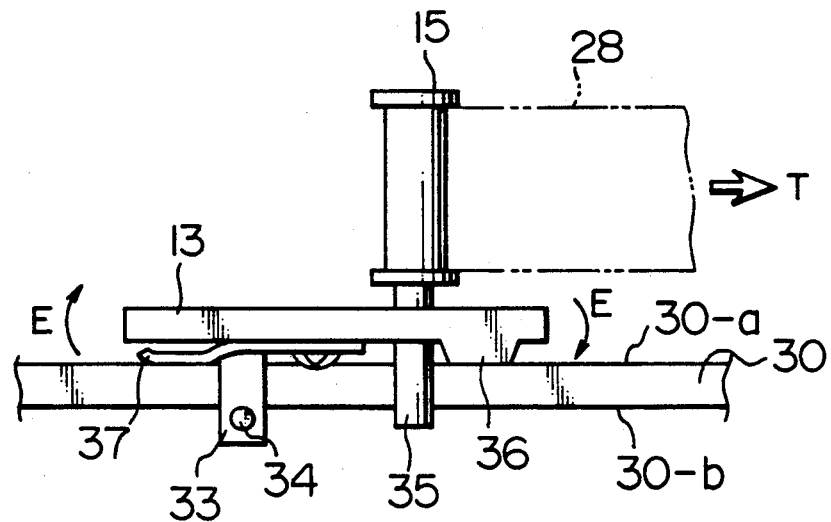
FIG. 5 is a side view of a tape pulling movable member constructed in accordance with the present invention.
Figure 6:
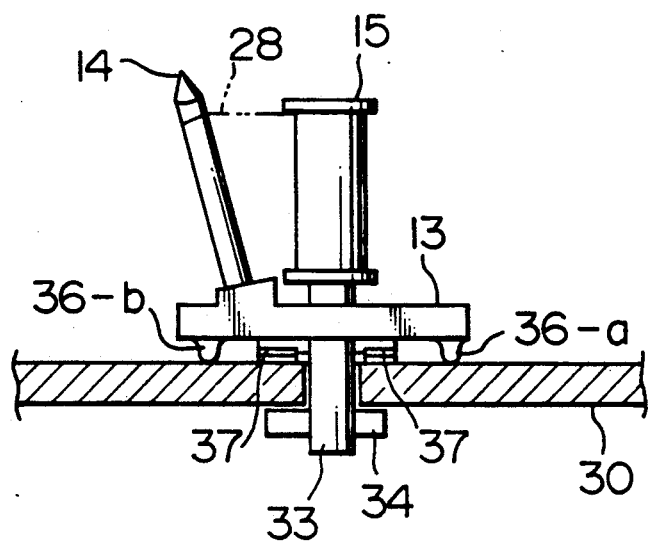
FIG. 6 is a schematic front view of the tape pulling member of FIG. 5.

The tape pulling movable members 11 and 13 have an identical structure, as shown in FIGS. 5 and 6. The movable member 13 is formed with sliders 36 and 34 which slide on a top surface 30-a of the guide member 30 and an undersurface 30-b thereof, respectively. Also, the tape pulling movable member 13 has on its undersurface guide pins 33 and 35 which guide the movable member 13 along the groove 32 formed in the guide member 30. In this embodiment, the slider 34 is provided on the guide pin 33.

Before loading, the tape 28 is positioned at a position a in the cassette 27 and makes contact with the pins 2 and 25, as shown in FIG. 1. Also, the tape guides 9 and 15, the slanting pins 10 and 14, the tape pulling posts 4 and 23 and the pinch roller 22 are disposed within the tape cassette 27 on the inner side of the tape 28. As the tape 28 is pulled out or withdrawn from the tape cassette 27, the tape 28 is shifted from the position a and comes into the positions indicated by b, c, and d. That is, when the tape is moved to the position b (FIG. 1), the tape 28 engages slightly with the rotational drum 12. Also, simultaneously, the movable correcting guides 6 and 18 make contact with the tape 28 from the side thereof remote from the tape cassette. Thereafter, the tape 28 is further pulled to the position c (FIG. 1). Movement of the tape 28 is completed when the tape 28 is in the position d (FIG. 1). At that time, the movable correcting guide 6 and 18 are located remotely from the tape 28.

Figure 7:
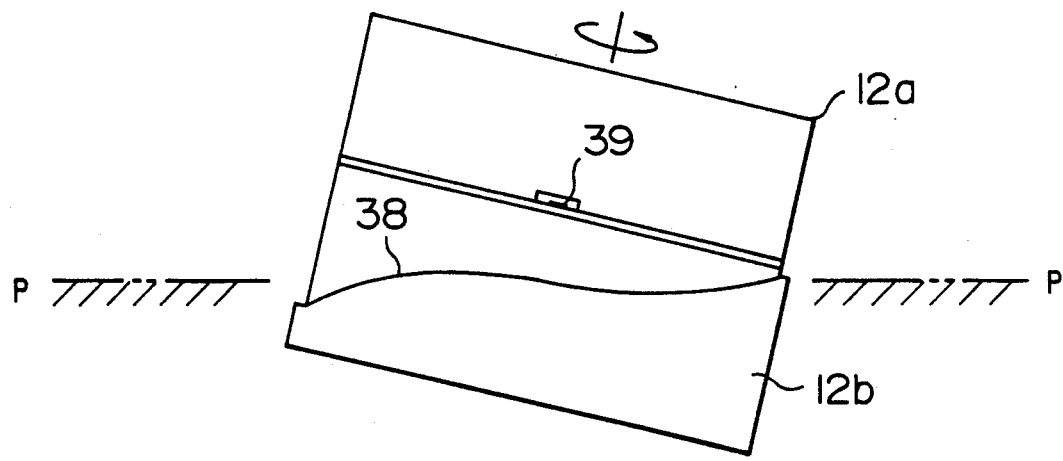
FIG. 7 is a schematic front view of a drum.
Figure 12:
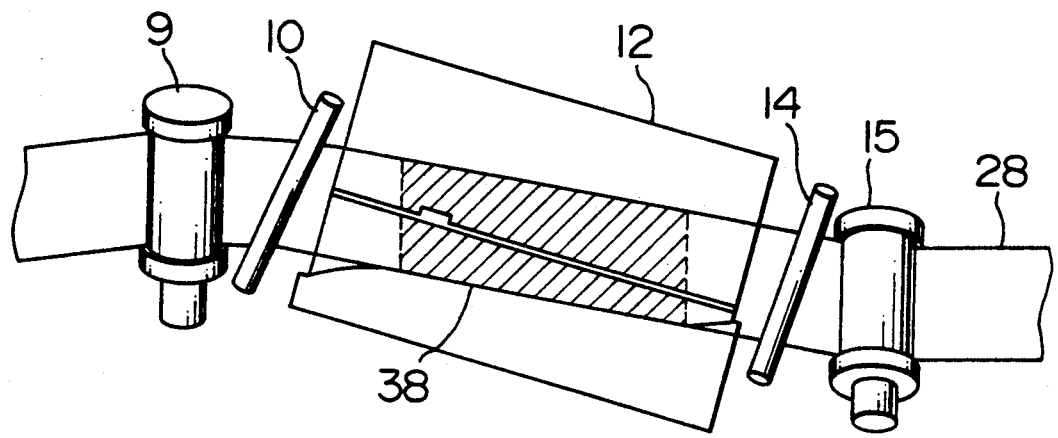
FIGS. 12 and 13 are schematic views depicting a manner by which a tape is brought into contact with the drum.
Figure 13:
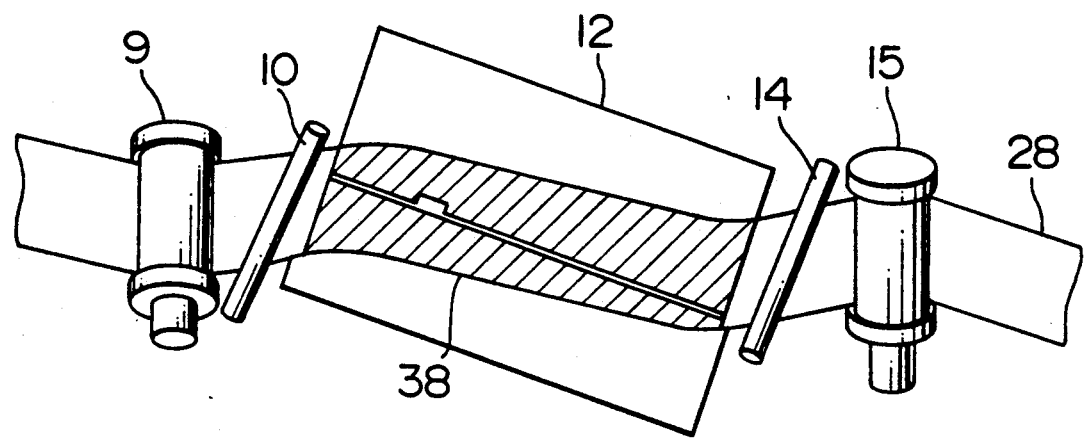
Figure 14:
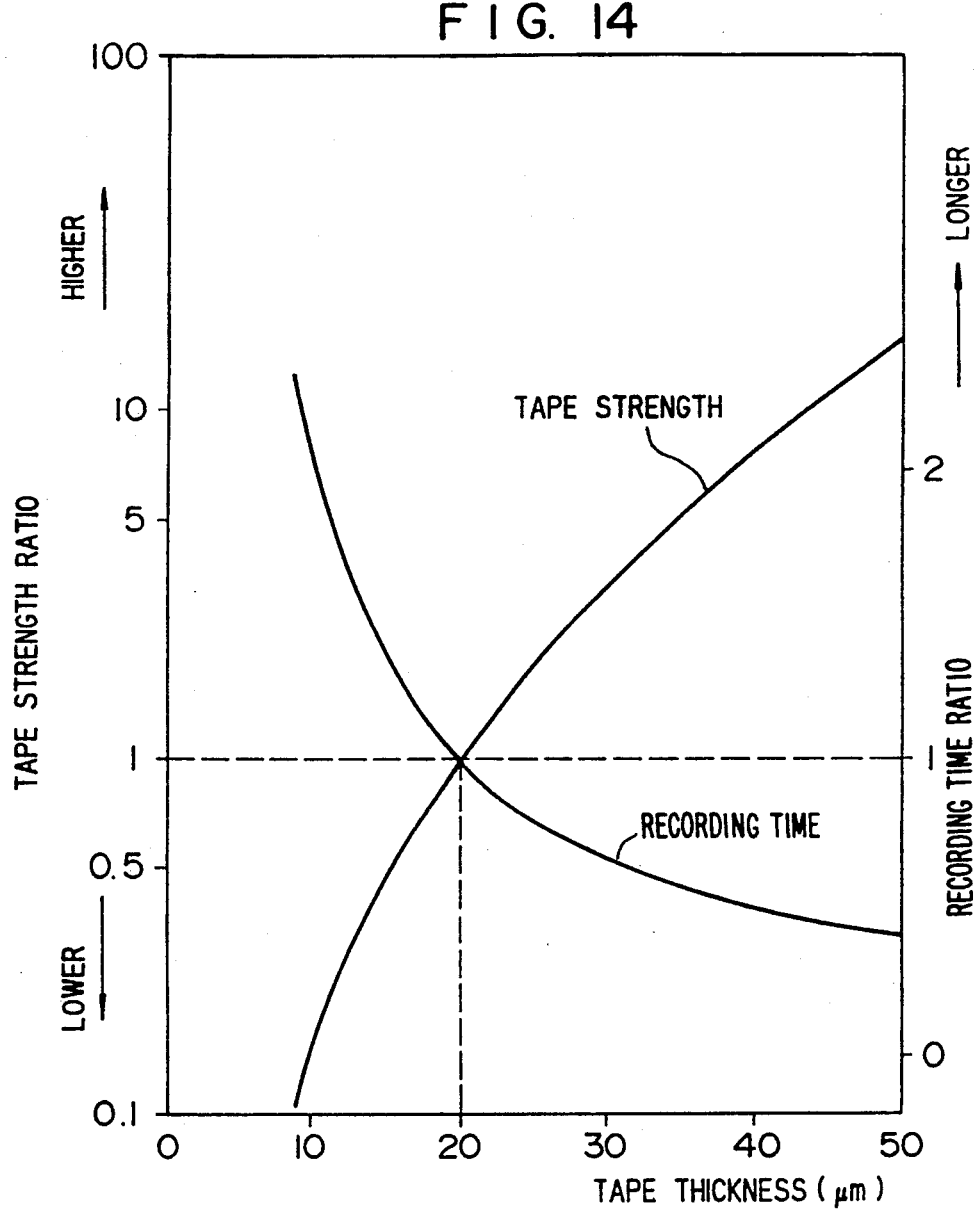
FIG. 14 is a graphical illustration of a relationship between a thickness of a tape and a strength thereof and between a thickness of a tape and recording time.
Figure 15:
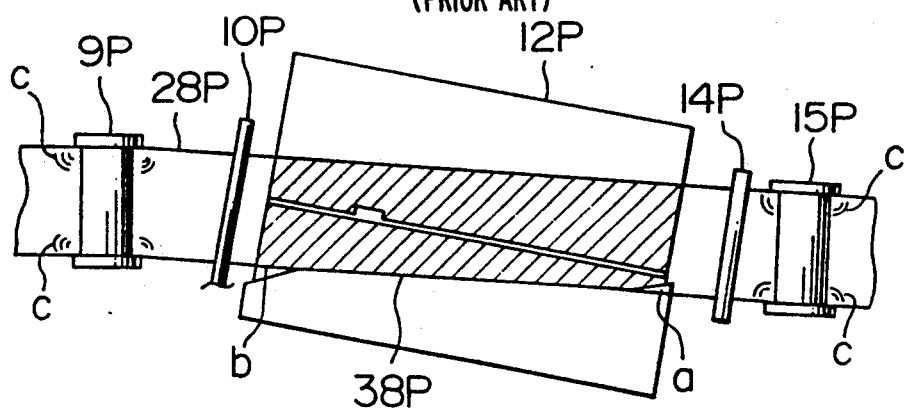
FIG. 15 is a schematic view of a conventional tape guiding device.

As shown in FIG. 7, the drum 12 includes a rotational cylindrical drum 12a and a fixed cylindrical drum 12b. A lead 38 is formed around the fixed drum 12b, with the lead 38 being a machined shoulder-like portion for guiding the tape 28 as the tape engages around the drum. This enables highly precise positioning of the tape on the drum and prevents damage to the tape which occurs at the lead 38. Hence, when the tape 28 is loaded, a position of the tape 28 needs to be controlled such that it can engage around the drum along the lead 38. That is, after the tape 28 has come into contact with the drum 2, the guides 9 and 15 change their position such that the lower edge of the tape 28 can run along the lead 38, as shown in FIG. 12. As the engaging angle of the tape on the drum increases, the tape guides 9, 15 further change their position such that the tape edge remains along the lead 38 of the drum throughout the loading operation, as shown in FIG. 13. The hatched portions of the tape shown in FIGS. 12 and 13 denote portions thereof which are in contact or engaged With the drum. In this embodiment, the vertical position and inclination angle of the tape guides 9 and 15 are changed while the vertical position of the tape 28 is controlled by the movable correcting guides during the tape loading so as to cause the tape 28 to run along the lead 38 thereof.

The position of the tape guides 9 and 15 is changed in the tape loading operation in a manner described below. That is, the guide members 29 and 30 are constructed such that they change their vertical position and inclination as the tape is pulled out of the cassette, as shown in FIGS. 2 to 4. This allows the position of the movable members 11 and 13 which slide along the guide members 29 and 30, to change according to changes in the vertical position and inclination angle of the guide members 29, 30. Since the tape guide 9 and the slanting pins 10 are fixed to the movable member 11, changes in the position of the movable member 11, which occur as the movable member 11 advances along the guide member 29, in turn change the positions of the tape guide 9 and the slanting pin 10. Similarly, the position of the tape guide 15 and of the slanting pin 14 changes as the position of the movable member 13 changes when the movable member 13 moves along the guide member 30. At that time, the positions of the tape guides 9 and 15 are changed such that the tape 28 can be engaged around the drum 12 along the lead 38.

Figure 8:
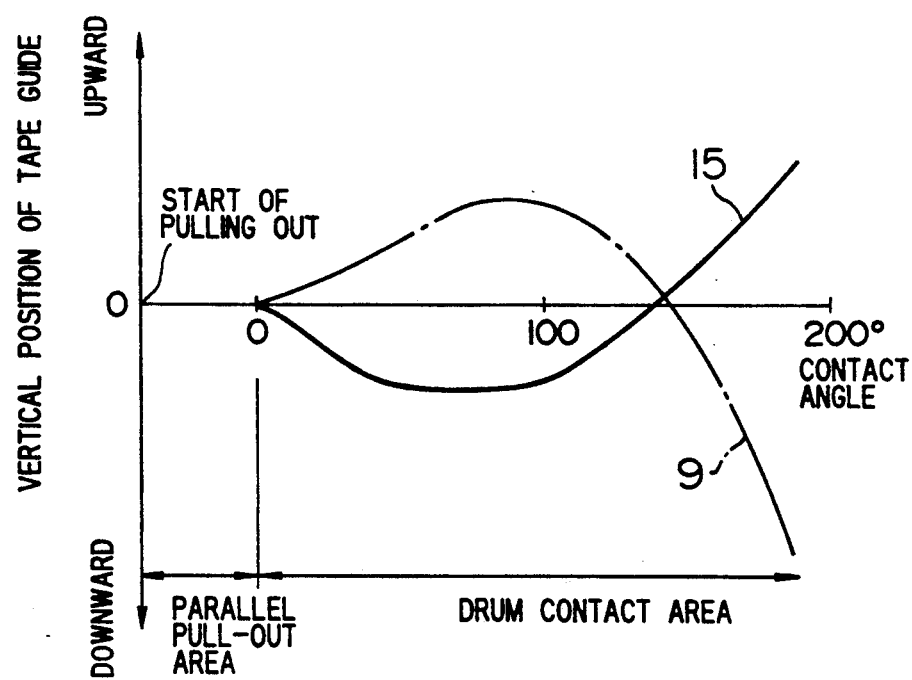
FIGS. 8-10 are graphical illustrations of changes in position of a tape guide.
Figure 9:
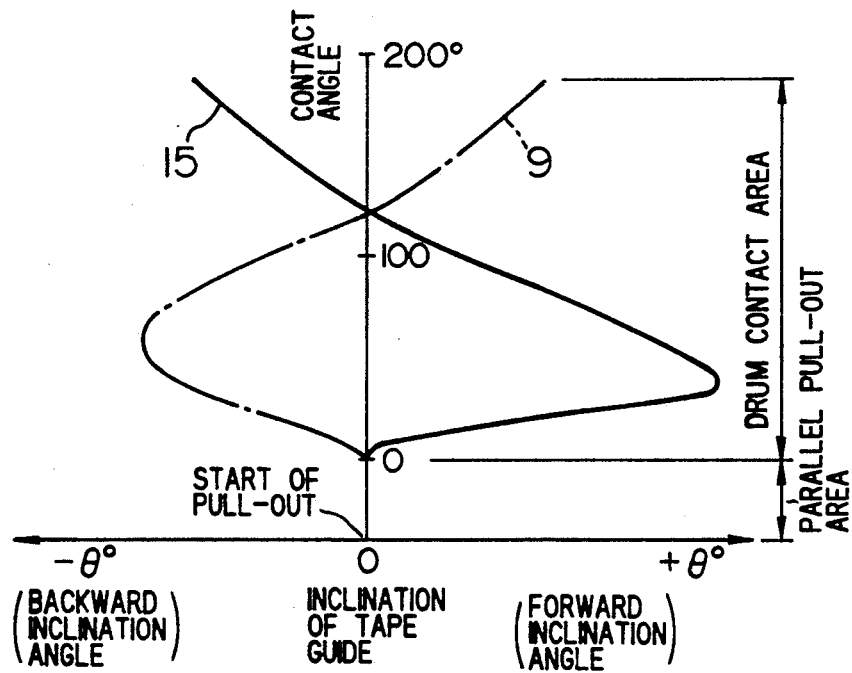
Figure 10:
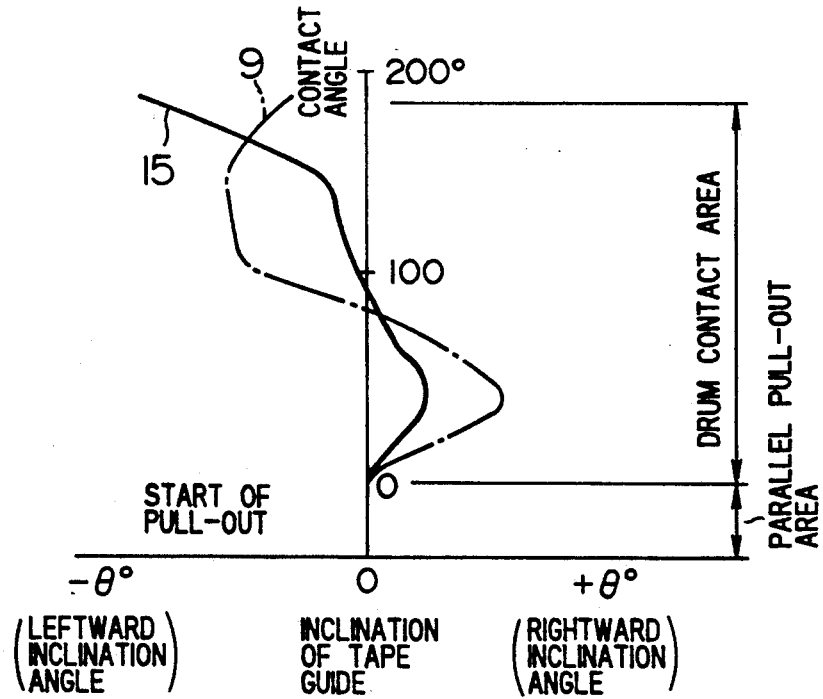

FIGS. 8 and 10 show how the position of the tape guides 9 and 15 actually changes such that the tape edge runs along the lead 38. That is, FIG. 8 shows how the tape guides 9 and 15 change their vertical positions when they pull out the tape 28. In the graph shown in FIG. 8, the position to which the tape is pulled out is indicated by the contact angle of the tape through which the tape is engaged with the drum 12. FIG. 9 shows forward and rearward inclinations of the tape guides 9 and 15, and FIG. 10 shown rightward and leftward inclinations of the tape guides 9 and 15. In FIGS. 8-10, the position of the tape guide 9 is indicated by a dot-dashed line, and the position of the tape guide 15 is indicated by the solid line. As can be seen from FIG. 8, the tape guide 9 does not change its vertical position from when the tape is accommodated in the tape cassette until the tape makes contact with the drum. In this area of the traveling path 31 of the tape guide 9, the tape guide 9 is not inclined forward or backward and rightward or leftward, either, as shown in FIGS. 9 and 10. After the tape has made contact with the drum, the tape guide gradually rises as the contact angle of the tape increases. The tape guide 9 begins advancing downwardly when the contact angle becomes about a half of the contact angle attained when the loading of the tape has been completed. Thereafter, the tape guide 9 rapidly advances downwardly until the loading is ended. As the tape guide is moved in the direction of its height in the manner described above, the inclination of the tape guide 9 also changes greatly. That is, as shown in FIG. 9, after the tape has made contact with the drum, the degree with which the tape guide 9 is rearwardly inclined increases as the contact angle increases. The direction in which the tape guide in inclined alters the rearward inclination to forward inclination at a certain point of its traveling path. At the final point, the tape guide 9 is inclined forwardly. Also, as shown in FIG. 10, the tape guide 9 is first inclined in a rightward direction. The direction of inclination of the tape guide alters from a rightward inclination to a leftward inclination at a certain point. At the final point, the tape guide 9 is inclined leftwardly.

The tape guide 15 changes its vertical position in the manner shown in FIG. 8 as it moves along the guide member 30. That is, the vertical position of the tape guide 15 remains the same until the tape makes contact with the drum. At that time, the vertical position of the tape guide 15 is the same as that of the tape guide 9. Thereafter, tape guide 15 begins advancing downwardly unlike the tape guide 9. At a certain advanced point of its traveling path, the tape guide 15 starts advancing upwardly. Tape loading is completed in a state in which the tape guide 15 is located at a higher position than that at which it is located when loading of the tape has started. The tape guide 15 is inclined forwardly or rearwardly in the manner shown in FIG. 9 while it moves along its path to pull out the tape. That is, no forward or rearward inclination occurs on the tape guide 15 until the tape makes contact with the drum. After the tape has made contact with the drum, the tape guide 15 is inclined forwardly at a large angle. Thereafter, the degree at which the tape guide 15 is forwardly inclined decreases, and the tape guide 15 is then rearwardly inclined. Loading of the tape is completed in a state in which the tape guide 15 is inclined rearwardly. The tape guide 15 is inclined rightward or leftward in the manner shown in FIG. 10 while it moves along its path to pull out the tape. That is, no rightward or leftward inclination occurs on the tape guide 15 until the tape makes contact with the drum. After the tape has made contact with the drum, the tape guide 15 begins to be inclined in a rightward direction. Thereafter, the direction in which the tape guide 15 is inclined alters from a rightward inclination to a leftward inclination. At the final point, the tape guide 15 is inclined leftwardly to a great extent. The above-described position of the tape guides can be calculated from the contact angle through which the tape made contact with the drum, the contact angle through which the tape made contact with the tape guides, the relative position of the relation between the movable correcting guides and the reels under the conditions that the tape edge runs along the lead of the drum and that the tape is not twisted when it spans between the posts. In this embodiment, the angle at which the tape enters and exits from the tape guide is made substantially perpendicular to the axes of the guides. In this way, displacement of the tape in its widthwise direction, which would occur when the tape runs over the tape guide during the loading, can be minimized. That is, riding of the tape edge over the tape guiding flange portions provided at the upper and lower ends of the tape guide and, hence, breakage or damage to the tape can be eliminated.

Figure 11:
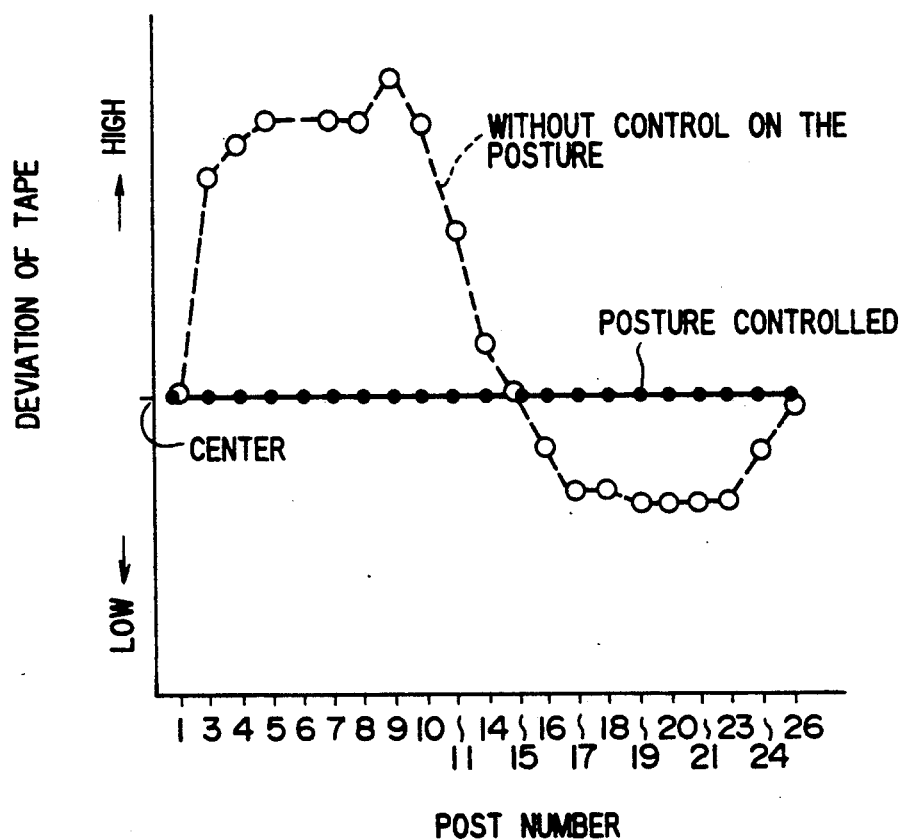
FIG. 11 is a graphical illustration of a height of a tape on posts of a tape loading mechanism.

Thus, the tape can be located at the center of the tape guide with a high degree of accuracy by pulling out the tape by the tape guides while the vertical positions and posture are changed. FIG. 11 shows the position of the tape on the tape guides located near the position c shown in FIG. 1 and on the other post. The broken line indicates how the tape deviates when no control is carried out on the posture of the tape guides and when the tape is pulled out by the tape guide located near the position c in the same manner as that in which it is pulled out of the initial stage of the loading operation. The solid line indicates the position of the tape when the posture of the tape guides has been controlled. When the posture of the tape guides is not controlled, the tape deviates from the tape guides at a large degree. This increases the possibility that the tape is damaged or falls from the tape guides. With the posture of the tape guide controlled, the tape runs at the center of the tape guides. This results in a realization of a highly precise tape guiding device.

In this embodiment, the sliders 36 and 34 grip the guide member 30 from the two sides thereof, as shown in FIGS. 5 and 6. Therefore, the tape pulling movable member can be positioned in place by the sliders 34 and 36 and thus be guided precisely along the contour of the guide member 30 even when a tension T in the tape is exerted on the tape guide 15 during the loading operation tending to make the tape pulling movable member be inclined in the direction indicated by the arrow E in FIG. 5. Furthermore, a spring member 37 is disposed at a position where it opposes the slider 34 in order to maintain the position of the tap guide 15 even when the tension T is small. In this manner, the tape pulling movable member can be positioned in place with a small amount of force. This, in turn, makes the movement of the movable member stable and increases the positioning accuracy.

As will be understood in the foregoing description, it is possible according to the present invention to threedimensionally maintain the position of the tape which has been pulled out by the tape guides in an optimum state which allows the tape edge to run along the lead of the drum during the tape loading or unloading operation. Consequently, damage to the tape can be prevented and stable running of thin tapes can be assured.

What is claimed is:

1. A magnetic tape loading apparatus comprising:
   a rotatable drum having a lead provided on an outer periphery thereof, said drum being adapted to be engaged by a magnetic tape during an operation of the apparatus;
   a pair of tape guides for pulling out said tape from a tape cassette into engagement with said drum;
   a pair of tape pulling movable members for respectively supporting said tape guides;
   means for driving said movable members and said tape guides together; and
   a pair of guide members for guiding said movable members and said tape guides such that positions of said tape guides relative to each other are changed during movements thereof by said driving means to cause an edge of the tape to continuously run along said lead of said drum when the tape is engaged with said drum, whereby, during a tape loading and unloading operation, damage to the tape can be prevented and stable running ensured.

2. A magnetic tape loading apparatus comprising:
   a rotatable drum having a lead provided on an outer periphery thereof, said drum being adapted to be engaged by a magnetic tape during an operation of the apparatus;
   a head provided on said drum to record information on said tape and/or reproduce information from the tape;
   a pair of tape guides for pulling out said tape from a tape cassette into engagement with said drum and for returning the tape from said drum back into the tape cassette, said tape guides having a predetermined first position relative to each other when the apparatus is not in operation;
   a pair of tape pulling movable members for respective supporting said tape guides;
   means for driving said movable members and said tape guides together; and
   a pair of guide members for guiding said movable members and said tape guides such that positions of said tape guides relative to each other are changed during at least a part of a loading of the tape, said guide members having sliding surfaces along which said movable members are moved together with said tape guides by said driving means, respectively, said sliding surfaces being shaped such that from a start of a pulling out of the tape until a part of the tape engages the drum, said tape guides have positions substantially corresponding to said first positions and such that, as an angle over which the tape is engaged with said drum is increased, said slide surfaces change the positions of said tape guides relative to each other to cause an edge of the tape to run along said lead on said drum, whereby, during a tape loading and unloading operation, damage to the tape can be prevented and stable running ensured.

3. A magnetic tape loading apparatus comprising:
   a rotatable drum having a lead provided on an outer periphery thereof, said drum being adapted to be engaged by a magnetic tape during an operation of the apparatus;

a head provided said drum for recording information on the magnetic tape and/or for reproducing information recorded on the tape;

a pair of tape guides for pulling out said tape from a tape cassette into engagement with said drum said tape guide having a predetermined first positions relative to each other when the apparatus is not in operation;

a pair of tape pulling movable members for respective supporting said tape guides;

means for driving said movable members and said tape guides together;

a pair of guide members for guiding said movable members and said tape guides such that positions of said tape guides relative to each other are changed during at least a pair of a loading of the tape to cause the tape guide to be guided by said guide means so that an edge of said tape continuously runs along said lead of said drum; and a pair of correcting guides movable while engaged with the tape when the tape is being pulled out of the cassette, to control an angle over which said tape is engaged with said tape guides.

4. A magnetic tape loading apparatus comprising:

a drum having a lad on an outer peripheral portion thereof for defining a vertical position of a magnetic tape engageable with said drum;

a head which is rotatable around a center axis of said drum for recording information on the tape and/or for reproducing information from the tape;

tape guides for pulling out the tape from a tape cassette into engagement with said drum and for returning the tape back into the tape cassette, said tape guides having predetermined positions relative to each other when the apparatus is not in operation;

correcting guides for controlling an angle over which the tape is engaged with the respective tape guides;

tape pulling movable members supporting and being movable together with said tape guides;

means for driving said movable members and said tape guides; and guide members having slide surfaces for guiding movements of said movable members and said tape guides, said slide surfaces being formed such that, from a time when the tape is pulled out until a part of said tape engages with said drum, said tape guides have relative positions substantially corresponding to said first positions and, as the angel over which the tape engages the drum increases, said slide surfaces change the positions of said tape guides relative to said drum to cause an edge of the tape to continuously run along said lead of said drum.

5. A magnetic tape loading apparatus according to claim 4, wherein each of said guide members has substantially parallel slide surfaces, and each of said tape pulling movable members include portions respectively slidable engageable with said parallel slide surfaces of an associated guide member.

6. A magnetic tape loading apparatus comprising:

a rotatable drum having a lead provided on an outer periphery thereof, said drum being adapted to be helically engaged by a magnetic tape during an operation of the apparatus;

a pair of guide members disposed on opposite sides o said drum;

a pair of tape guides engageable with the tape and movable along said guide members for pulling out the tape from a tape cassette into engagement with said drum along said lead;

a pair of tape pulling movable members respectively supporting said tape guides and slidably movably mounted on said guide members; and means for driving said movable members and said tape guides together, wherein said guide members have upper slide surfaces, along which said movable members are moved by said driving means, said slide surfaces being formed such that, in the course of at least a part of a tape-pulling out operation of said tape guides caused by movements of said movable members along said guide members, said tape guides travel while inclined forwardly and rearwardly, as viewed in a direction of travel of the tape guide, to assure that an edge of the tape runs along said lead on said drum.

7. A magnetic tape loading apparatus according to claim 6, wherein said slide surfaces include further surface portions formed so as to cause lateral inclinations of said tape guides during at least a part of movements thereof.

8. A magnetic tape loading apparatus comprising:

a rotatable drum having a lead provided on an outer periphery thereof, said drum being adapted to be engaged by a magnetic tape during an operation of the apparatus;

a head provided on said outer periphery of said drum to record information on the tape and/or to reproduce information from the tape;

means for pulling the tape out from a tape cassette and into engagement with said drum, said means for pulling the tape out of the cassette including first and second tape guides movable respectively along first and second paths on first and second sides of said drum and engageable with the tape to pull the tape out from the tape cassette and into engagement with the outer periphery of said drum, said first side of said drum being a side at which the tape is fed onto said drum, and said second side of said drum being a side at which the tape is returned from said drum back into the cassette;

first and second tape pulling movable members respectively supporting said first and second tape guides;

means for driving said first and second movable embers and said tape guides along said first and second paths;

first and second guide members disposed on said first and second sides of said drum to respectively define said first and second paths, wherein said first and second guide members have first and second guide surfaces respectively slidably engaged by bottom surfaces of said movable members, and wherein said first and second guide surfaces are contoured such that, during at least a part of movements of said first and second movable members to cause said first and second tape guides to bring the tape into engagement with said drum, said first and second tape guides travel while they are inclined forwardly and rearwardly as viewed int the directions of travel thereof such that the inclinations of the first and second tape guides occur in substantially opposite directions.

9. A magnetic tape loading apparatus according to claim 8, wherein said first and second guide surfaces of said first and second guide members are further contoured such that, during at least a part of the movements of said first and second tape guides to being the tape into engagement with said drum, said first and second tape guides are also inclined laterally as viewed in the direction of travel thereof.

* * * * *